(No Model.)
N. H. BEARSE.
SPIRIT LEVEL.
No. 284,712. Patented Sept. 11, 1883.
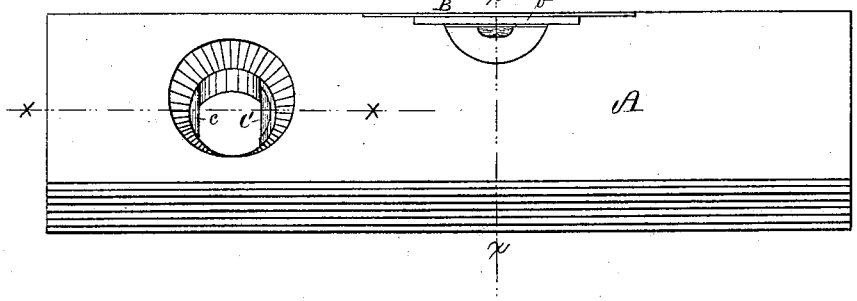
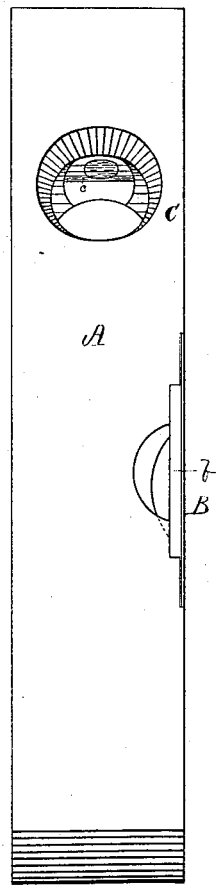
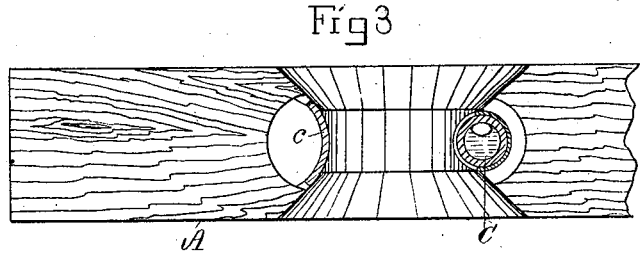
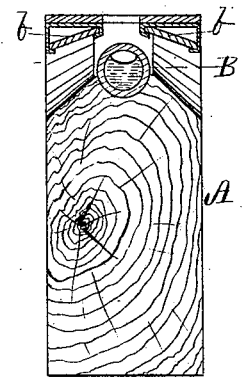
Witnesses.
L. N. Miller
John R. Snow.
Inventor.
Nelson H. Bearse
J. E. Maynadier
his Atty

UNITED STATES PATENT OFFICE.

NELSON H. BEARSE, OF OSTERVILLE, MASSACHUSETTS.

SPIRIT-LEVEL.

SPECIFICATION forming part of Letters Patent No. 284,712, dated September 11, 1883.

Application filed May 28, 1883. (No model.)

*To all whom it may concern:*

Be it known that I, NELSON H. BEARSE, of Osterville, in the county of Barnstable and State of Massachusetts, have invented a new and useful Improvement in Spirit-Levels, of which the following is a specification.

My invention relates to improvements in levels, in which the position of the air-bubble is ascertained by its reflection when it is in such a position that it cannot be observed in the usual way. The object is to provide a fixed reflector that will always show the position of the bubble from either side, thereby avoiding the necessity of adjusting the reflector for opposite sides of the level, as heretofore done in levels of this class.

To attain this object my invention consists in the combination, with a spirit-level, of a convex or double-face reflector permanently fixed above the level and casting a reflection to both sides.

In the accompanying drawings, which illustrate a mason's or carpenter's level embodying my improvements, Figure 1 is a view showing the reflection of the bubble when the level is held horizontally above the head, and Fig. 2 is a view showing the level in position for plumbing a surface higher than the head and the reflection of the air-bubble. Fig. 3 is a section on line $x\,x$, Fig. 1; and Fig. 4 is a section on line $x\,x$, Fig. 2.

The rectangular block A, the horizontal level B, and the vertical or plumb level C are of the usual well-known construction.

Above the horizontal level B, and each side of the usual sight-opening, is located a reflector, $b$, such as a piece of looking-glass. Each reflector is inclined so as to show the air-bubble when the level is too high to look through the sight-opening. Two reflectors are provided, so as to form a double reflector and enable the position of the bubble to be observed from either side.

Above the plumb-level C is located a reflector, $c$, parallel with the level C, and rounded on its lower surface to enable the reflection of the air-bubble to be seen from either side.

In leveling and plumbing it is often necessary to hold the level as high as you can reach, and in such cases something has heretofore been provided to stand upon in order to observe the air-bubble.

I am aware that reflectors have also been used for this purpose. In one instance the reflector was set into one side, and in another a reflector was arranged on pivots, so as to be adjusted to throw the reflection to either side. In my improved level the reflection can always be seen from either side, and adjustments are rendered unnecessary by the convex surface or double face. I therefore do not claim, broadly, the combination of a level and a reflector. With my improved level the position of the bubble is readily ascertained from either side by means of its reflection when the arms are extended as high as possible above the head.

I claim as my invention—

A convex mirror or reflector, in combination with a spirit-level, the reflector being arranged so as to enable the reflection of the air-bubble to be seen from either side when the level is held above the head, substantially as and for the purpose set forth.

N. H. BEARSE.

Witnesses:
A. S. HALLETT,
E. E. ELDRIDGE.